United States Patent
Kim et al.

(10) Patent No.: US 9,944,191 B2
(45) Date of Patent: Apr. 17, 2018

(54) UNMANNED AERIAL VEHICLE, UNMANNED AERIAL VEHICLE CHARGING SYSTEM AND CONTROL METHOD THEREOF

(71) Applicant: Industry-Academic Cooperation Foundation Gyeongsang National University, Jinju-si (KR)

(72) Inventors: Ki-il Kim, Jinju-si (KR); Chung-jae Lee, Incheon (KR); Kyong-hoon Kim, Jinju-si (KR)

(73) Assignee: INDUSTRY-ACADEMIC COOPERATION FOUNDATION GYEONGSANG NATIONAL UNIVERSITY, Jinju-si (KR)

( * ) Notice: Subject to any disclaimer, the term of this patent is extended or adjusted under 35 U.S.C. 154(b) by 258 days.

(21) Appl. No.: 14/947,076

(22) Filed: Nov. 20, 2015

(65) Prior Publication Data
US 2016/0250933 A1 Sep. 1, 2016

(30) Foreign Application Priority Data
Feb. 26, 2015 (KR) .................. 10-2015-0027347

(51) Int. Cl.
*H02J 7/00* (2006.01)
*B60L 11/18* (2006.01)
*B64C 39/02* (2006.01)

(52) U.S. Cl.
CPC .......... *B60L 11/182* (2013.01); *B64C 39/024* (2013.01); *B64C 2201/042* (2013.01); *B64C 2201/066* (2013.01)

(58) Field of Classification Search
CPC ......... B64C 39/024; H02J 5/005; H02J 7/025; H02J 7/005; B60L 11/182; B60L 11/1816;
(Continued)

(56) References Cited

U.S. PATENT DOCUMENTS

| | | | |
|---|---|---|---|
| 2014/0339371 A1 | 11/2014 | Yates | |
| 2016/0031564 A1* | 2/2016 | Yates | .......... B64D 33/00 307/9.1 |
| 2016/0185454 A1* | 6/2016 | Hutson | .......... B64C 39/024 244/17.23 |

FOREIGN PATENT DOCUMENTS

CN 202929383 5/2013

OTHER PUBLICATIONS

Written Opinion (Translated) dated Aug. 9, 2016 in corresponding Korean Application No. 20150027347.
(Continued)

*Primary Examiner* — Paul Dinh
(74) *Attorney, Agent, or Firm* — Ohlandt, Greeley, Ruggiero & Perle, LLP

(57) ABSTRACT

An unmanned aerial vehicle is provided. The unmanned aerial vehicle includes: a battery; a battery residual quantity detector configured to detect a residual quantity of the battery; a communicator configured to perform communication with a rechargeable unmanned aerial vehicle used in charging or replacement of the battery; and a processor configured to control the communicator to transmit its operation information to the rechargeable unmanned aerial vehicle detected within a predetermined distance when the detected residual quantity of the battery is less than the predetermined reference quantity and control to wirelessly charge the battery by the power supplied from the rechargeable unmanned aerial vehicle to maintain an operable state of the unmanned aerial vehicle or replace the battery to a new battery provided from the rechargeable unmanned aerial vehicle when being close to the rechargeable unmanned aerial vehicle receiving the operation information.

3 Claims, 6 Drawing Sheets

(58) Field of Classification Search
CPC .............. B60L 11/1829; B60L 11/1611; B60L 11/1861; B60L 2230/16
USPC ........................................................ 320/108
See application file for complete search history.

(56) References Cited

OTHER PUBLICATIONS

Notice of Rejection (Translated) dated Dec. 23, 2016 in corresponding Korean Application No. 20150027347.
Notice of Rejection (Translated) dated Feb. 28, 2017 in corresponding Korean Application No. 20150027347.

* cited by examiner

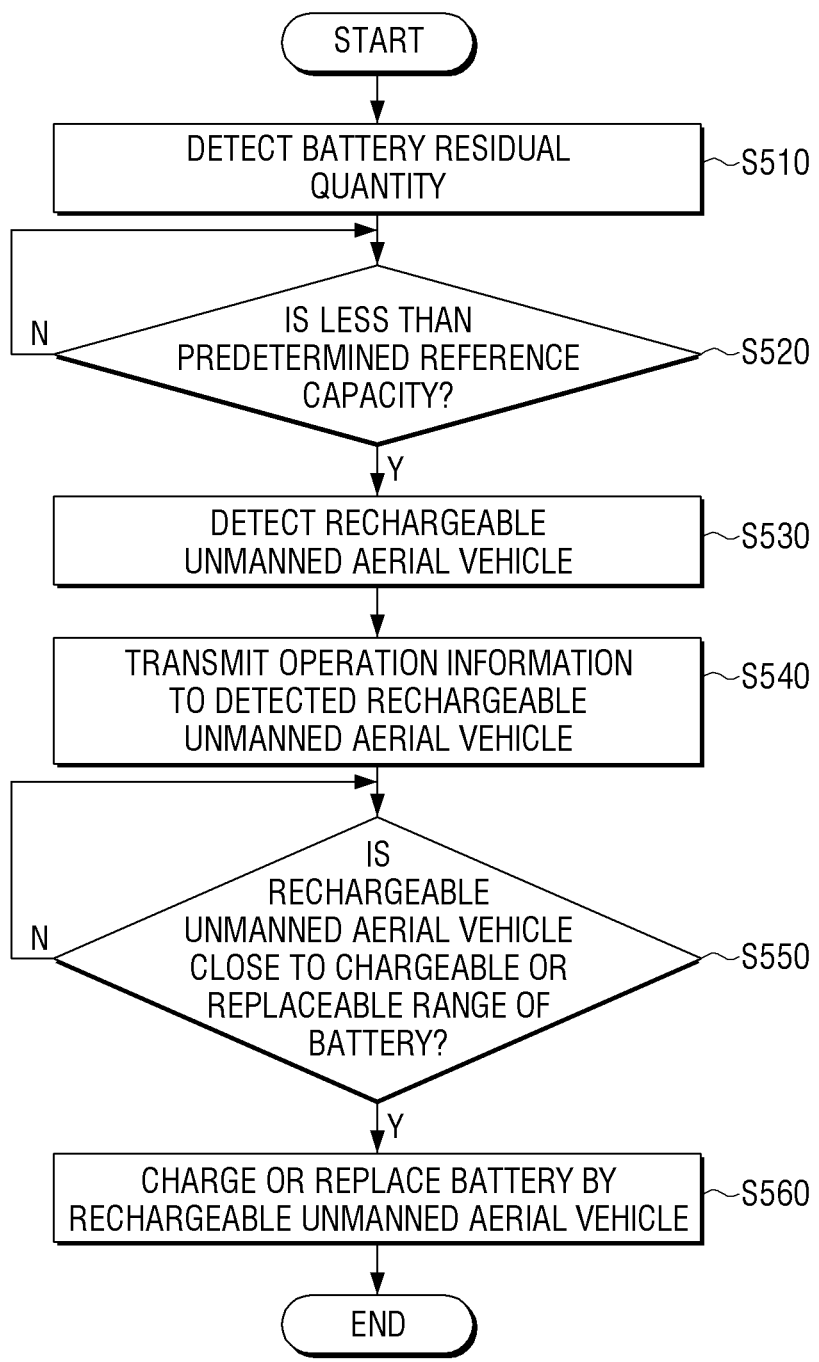

UNMANNED AERIAL VEHICLE, UNMANNED AERIAL VEHICLE CHARGING SYSTEM AND CONTROL METHOD THEREOF

CROSS-REFERENCE TO RELATED APPLICATIONS

This application claims priority from Korean Patent Application No. 10-2015-0027347, filed on Feb. 26, 2015, in the Korean Intellectual Property Office, the disclosure of which is incorporated herein by reference in its entirety.

BACKGROUND OF THE INVENTION

Field of the Invention

Apparatuses and methods consistent with the present invention relates to an unmanned aerial vehicle, an unmanned aerial vehicle charging system, and a control method thereof, and more particularly, to an unmanned aerial vehicle, an unmanned aerial vehicle charging system, and a control method thereof capable of wirelessly charging or replacing a battery.

Description of the Related Art

Recently, for the purpose of surface observation, weather observation, military reconnaissance and surveillance, and the like, an unmanned aerial vehicle (UAV) has received attention. The UAV means an airplane which performs a dangerous mission to be difficult to be directly performed by a human or be directly performed by a remote control or an autonomous flight control apparatus without a pilot.

The UAV has advantages of observing an area to be difficult to approach by the human such as a mountain area because there is a risk of human injury, and particularly, performing precise observation by excellent visibility due to the low altitude flight. Further, the UAV has largely received the attention for a military use in that penetration is possible while avoiding a radar fence due to the low altitude flight.

One of the most important objects related with the UAV is to increase an endurance time. However, since a battery mounted on the UAV is only limited in size and weight, there is a limit to energy storage capacity, and as a result, it is much difficult to increase the endurance time.

Accordingly, an existing UAV performs charging by physically approaching to a charging system established in advance and then performs the mission again when the energy is insufficient during the flight. However, a charging method by a static charging system has problems in that continuity of the mission capability of the UAV is vitiated and much cost to separately establish the charging system is consumed.

Therefore, it is required to find a method of implementing the UAV in which long endurance is possible by using a dynamic charging system so as to ensure continuity of the mission capability.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides an unmanned aerial vehicle, an unmanned aerial vehicle charging system, and a control method thereof capable of being charged by a dynamic charging system to be long endurance.

According to an aspect of the present invention, an unmanned aerial vehicle includes: a battery; a battery residual quantity detector configured to detect a residual quantity of the battery; a communicator configured to perform communication with a rechargeable unmanned aerial vehicle used in charging or replacement of the battery; and a processor configured to control the communicator to transmit its operation information to the rechargeable unmanned aerial vehicle detected within a predetermined distance when the detected residual quantity of the battery is less than the predetermined reference quantity and control to wirelessly charge the battery by the power supplied from the rechargeable unmanned aerial vehicle to maintain an operable state of the unmanned aerial vehicle or replace the battery to a new battery provided from the rechargeable unmanned aerial vehicle when being close to the rechargeable unmanned aerial vehicle receiving the operation information.

Here, the operation information may include set status information regarding a destination, a current speed, a progress direction, an air flow, and charging or replacement of the battery.

Further, the processor may perform the charging or replacement of the battery when the rechargeable unmanned aerial vehicle is close to the chargeable or replaceable range of the battery while maintaining an operation route of the unmanned aerial vehicle, and the rechargeable unmanned aerial vehicle may calculate a cross point with the unmanned aerial vehicle within a shortest time on the operation route of the unmanned aerial vehicle based on the operation information of the rechargeable unmanned aerial vehicle and the operation information received from the unmanned aerial vehicle and change the operation route to the cross point to move to the chargeable or replaceable range of the battery.

Further, the processor may perform docking with the rechargeable unmanned aerial vehicle and perform the replacement of the battery by a method of receiving and attaching a new battery from the docked rechargeable unmanned aerial vehicle, when the rechargeable unmanned aerial vehicle is close to the replaceable range of the battery.

Further, the processor may perform the charging of the battery by a method of wirelessly charging the battery by the power supplied from the rechargeable unmanned aerial vehicle while the unmanned aerial vehicle maintains level with the rechargeable unmanned aerial vehicle, when the rechargeable unmanned aerial vehicle is close to the chargeable range of the battery.

Further, the processor may calculate a quantity of the battery required for the unmanned aerial vehicle to reach a target point and compare the calculated quantity and the residual quantity of the battery to detect the rechargeable unmanned aerial vehicle only when the residual quantity of the battery is smaller than the calculated quantity.

According to another aspect of the present invention, a control method of an unmanned aerial vehicle includes: detecting a residual quantity of a battery; detecting a rechargeable unmanned aerial vehicle within a predetermined distance when the detected residual quantity of the battery is less than the predetermined reference quantity; transmitting its operation information to the detected rechargeable unmanned aerial vehicle when the rechargeable unmanned aerial vehicle is detected; and controlling to charge the battery by the power supplied from the rechargeable unmanned aerial vehicle to maintain an operable state of the unmanned aerial vehicle or replace the battery to a new battery provided from the rechargeable unmanned aerial vehicle when being close to the rechargeable unmanned aerial vehicle receiving the operation information.

Here, the operation information may include information regarding a destination, a current speed, a progress direction, an air flow, and a charging method.

Further, in the controlling, the charging or replacement of the battery may be performed when the rechargeable unmanned aerial vehicle is close to the chargeable or replaceable range of the battery while maintaining an operation route of the unmanned aerial vehicle, and the rechargeable unmanned aerial vehicle may calculate a cross point with the unmanned aerial vehicle within a shortest time on the operation route of the unmanned aerial vehicle based on the operation information of the rechargeable unmanned aerial vehicle and the operation information received from the unmanned aerial vehicle and change the operation route to the cross point to move to the chargeable or replaceable range of the battery.

Further, the controlling may include performing docking with the rechargeable unmanned aerial vehicle and performing the replacement of the battery by a method of receiving and attaching a new battery from the docked rechargeable unmanned aerial vehicle, when the rechargeable unmanned aerial vehicle is close to the replaceable range of the battery.

Further, in the controlling, the charging of the battery may be performed by a method of wirelessly charging the battery by the power supplied from the rechargeable unmanned aerial vehicle while the unmanned aerial vehicle maintains level with the rechargeable unmanned aerial vehicle, when the rechargeable unmanned aerial vehicle is close to the chargeable range of the battery.

Further, the controlling may include calculating a quantity of the battery required for the unmanned aerial vehicle to reach a target point and comparing the calculated quantity and the residual quantity of the battery to detect the rechargeable unmanned aerial vehicle only when the residual quantity of the battery is smaller than the calculated quantity.

According to the foregoing diverse exemplary embodiments of the present invention, it is possible to ensure continuity of a mission by using long endurance of the unmanned aerial vehicle.

Additional and/or other aspects and advantages of the invention will be set forth in part in the description which follows and, in part, will be obvious from the description, or may be learned by practice of the invention.

BRIEF DESCRIPTION OF THE DRAWING FIGURES

The above and/or other aspects of the present invention will be more apparent by describing certain exemplary embodiments of the present invention with reference to the accompanying drawings, in which:

FIG. 5 is a flowchart for describing a control method of an unmanned aerial vehicle according to an exemplary embodiment of the present invention.

DETAILED DESCRIPTION OF THE EXEMPLARY EMBODIMENTS

Figure 1:
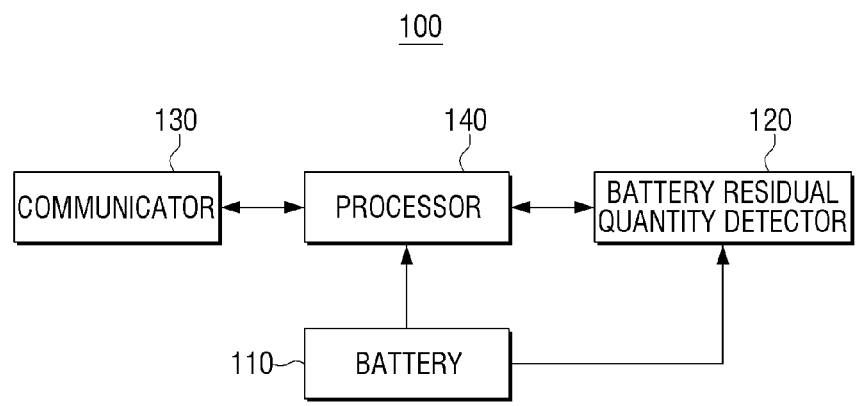
FIG. 1 is a block diagram schematically illustrating a configuration of an unmanned aerial vehicle according to an exemplary embodiment of the present invention.

Certain exemplary embodiments of the present invention will now be described in greater detail with reference to the accompanying drawings.

In the following description, same drawing reference numerals are used for the same elements even in different drawings. The matters defined in the description, such as detailed construction and elements, are provided to assist in a comprehensive understanding of the invention. Thus, it is apparent that the exemplary embodiments of the present invention can be carried out without those specifically defined matters. Also, well-known functions or constructions are not described in detail since they would obscure the invention with unnecessary detail.

FIG. 1 is a block diagram schematically illustrating a configuration of an unmanned aerial vehicle according to an exemplary embodiment of the present invention.

Referring to FIG. 1, an unmanned aerial vehicle 100 according to an exemplary embodiment of the present invention includes a battery 110, a battery residual quantity detector 120, a communicator 130, and a processor 140.

The unmanned aerial vehicle 100 may have a general airplane or helicopter structure. In the case where the unmanned aerial vehicle 100 has the helicopter structure, the unmanned aerial vehicle 100 may provide one or more rotors which rotate by a motor or an engine installed on a fuselage to generate lift force.

The battery 110 is a configuration of supplying power to the unmanned aerial vehicle 100. The unmanned aerial vehicle 100 may generate and output power required for operation the unmanned aerial vehicle 100 by using the power charged in the battery 110. Particularly, the battery 110 may supply operating power to the motor provided for rotating the rotors and the like of the unmanned aerial vehicle 100.

The battery 110 may be one or a plurality of batteries designed in a structure detachable from the unmanned aerial vehicle 100. Particularly, since the unmanned aerial vehicle 100 performs communication by a wireless communication system, a battery for wireless communication may be separately provided from a battery for operation the unmanned aerial vehicle 100.

The battery 110 may be implemented by various types such as a nickel-cadmium (Ni—Cd) battery, and nickel-hydrogen (Ni-MH), lithium-ion (Li-Ion), and lithium-polymer (Li-Poly) cells, and the spirit of the present invention may be extended up to a fuel cell, a chemical cell, and a solar cell.

The battery residual quantity detector 120 is a configuration of detecting a battery residual quantity according to a charging and discharging state of the battery 110. In detail, the battery residual quantity detector 120 may detect the residual quantity of the battery 110 by measuring voltage or current of the battery 110. Since the battery has a characteristic in which voltage drops with a use time, the battery residual quantity detector 120 may measure the residual quantity of the battery 110 by using the characteristic of the battery.

Further, the battery residual quantity detector 120 divides the residual quantity of the battery 110 into a plurality of levels according to a magnitude of the measured voltage and may also detect information on the level to which the measured voltage of the battery 110 belongs as the battery residual quantity.

Further, the battery residual quantity detector 120 checks and detects the residual quantity of the battery 110 every predetermined time or period and may transmit information on the residual quantity to the controller 140.

The communicator 130 is a configuration of performing communication with the rechargeable unmanned aerial vehicle used for charging or replacing the battery 110.

A communication system in which the communicator 130 performs communication with the rechargeable unmanned aerial vehicle needs to ensure a wide coverage based on an activity radius of the unmanned aerial vehicle 100 and ensure a stable communication environment for network traffic. The communicator 130 may transmit operation information regarding a speed, an altitude, and a coordinate of the unmanned aerial vehicle through a ground system or directly to the rechargeable unmanned aerial vehicle.

Further, in the case where the unmanned aerial vehicle 100 is an unmanned aerial vehicle to operate as a mission of reconnaissance and observation, the unmanned aerial vehicle 100 may operate by mounting a camera and an image system, and the image system may transmit an image to the ground system by using the communicator 130.

The communicator 130 may transmit or receive information via radio waves and use an ultra high frequency (UHF) band of 300 MHz to 3 GHz according to a radio wave law. To this end, the communicator 130 may provide an RF modem, an antenna, and the like by a radio frequency (RF) wireless data system. The RF modem is a module for transmitting operation information of the unmanned aerial vehicle to the ground system or another unmanned aerial vehicle in real time and receiving commands required for a control of the unmanned aerial vehicle. The antenna serves as a transmission line transmitting actual data.

The processor 140 is a configuration of controlling an overall operation of the unmanned aerial vehicle 100. Particularly, the processor 140 may detect the rechargeable unmanned aerial vehicle within a predetermined distance to control the unmanned aerial vehicle 100 so as to perform replacement or charging of the battery 110 from the detected rechargeable unmanned aerial vehicle, when the residual quantity of the battery 110 detected in the battery residual quantity detector 120 is less than a predetermined reference quantity.

In detail, the processor 140 may control the battery residual quantity detector 120 to detect the residual quantity of the battery 110 at a predetermined time or period and determine whether the detected residual quantity of the battery 110 is less than the predetermined reference quantity according to information received from the battery residual quantity detector 120. Further, the processor 140 may also determine whether the detected residual quantity of the battery 110 is less than a specific level among a plurality of predetermined levels.

The processor 140 may detect the rechargeable unmanned aerial vehicle within the predetermined distance when it is determined that the detected residual quantity of the battery 110 is less than the predetermined quantity. The processor 140 may propagate a detection signal for detecting the rechargeable unmanned aerial vehicle through the communicator 130, and control the communicator 130 to transmit its operation information to the detected rechargeable unmanned aerial vehicle when receiving a response signal from the rechargeable unmanned aerial vehicle receiving the detection signal.

Here, the operation information may include set status information regarding a destination, a current speed, a height, a coordinate, a progress direction, an air flow, and charging or replacement of the battery. Here, the set status information regarding the charging or replacement of the battery means a predetermined status on whether to perform charging of the battery 110 or replace the battery 110 with a new battery of the rechargeable unmanned aerial vehicle by a method of receiving the power from the rechargeable unmanned aerial vehicle.

The processor 140 may perform charging or replacement of the battery 110 when the rechargeable unmanned aerial vehicle is close to a chargeable or replaceable range of the battery 110 while maintaining an operation route of the unmanned aerial vehicle. A detailed method of charging or replacing the battery 110 will be described below in FIGS. 3 and 4.

Figure 2:
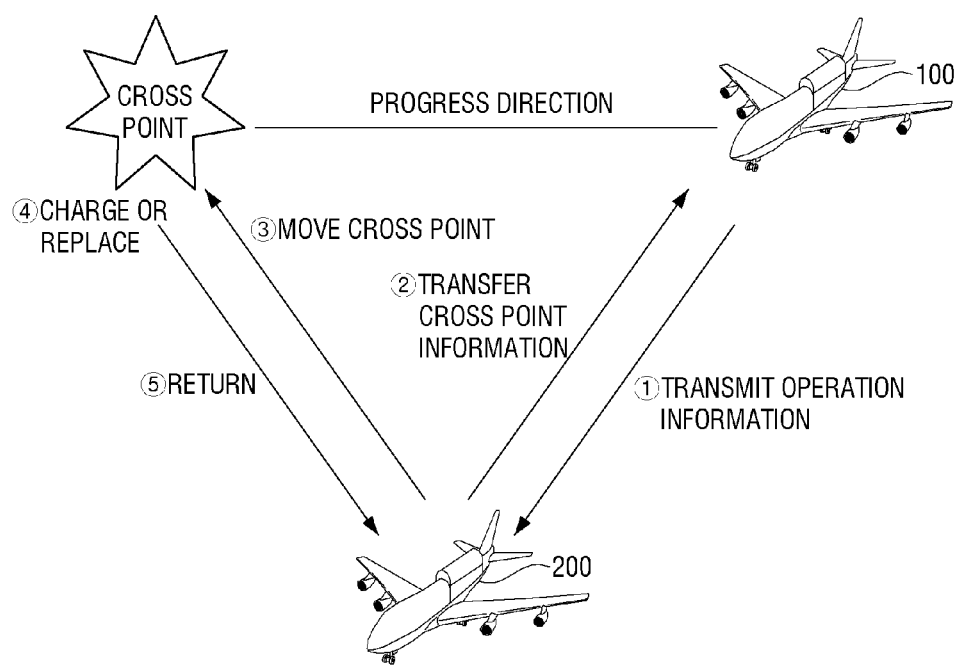
FIG. 2 is a diagram for describing a process of being close to a chargeable or replaceable range of a battery while a rechargeable unmanned aerial vehicle communicates with the unmanned aerial vehicle according to the exemplary embodiment of the present invention.

FIG. 2 is a diagram for describing a process of being close to a chargeable or replaceable range of a battery while the rechargeable unmanned aerial vehicle communicates with the unmanned aerial vehicle according to the exemplary embodiment of the present invention.

As illustrated in FIG. 2, the unmanned aerial vehicle 100 detects a neighboring rechargeable unmanned aerial vehicle 200 and transmits its operation information to the detected rechargeable unmanned aerial vehicle 200 when it is determined that the residual quantity of the battery 110 is less than the predetermined reference quantity (①).

Here, the rechargeable unmanned aerial vehicle 200 may be prepared the same as the unmanned aerial vehicle 100 as an unmanned aerial vehicle prepared for charging the unmanned aerial vehicle 100. Alternatively, the rechargeable unmanned aerial vehicle 200 may be an unmanned aerial vehicle performing a specific mission.

The rechargeable unmanned aerial vehicle 200 may calculate a cross point with the unmanned aerial vehicle 100 within a shortest time in the operation route of the unmanned aerial vehicle 100 based on the operation information received from the unmanned aerial vehicle 100 and its operation information. That is, the rechargeable unmanned aerial vehicle 200 may predict and calculate a cross point capable of meeting with the unmanned aerial vehicle 100 within a shortest time by adding up the operation information regarding a destination, a current speed, a progress direction, a height, a coordinate, an air flow, and the like of the unmanned aerial vehicle 100 and its operation information.

In this case, the rechargeable unmanned aerial vehicle 200 may transmit information on the calculated cross point, information on an expected battery charging or replacing time, and the like to the unmanned aerial vehicle 100 (②).

Further, the predicting and calculating of the aforementioned cross point may be performed in the unmanned aerial vehicle 100 requiring the charging. The unmanned aerial vehicle 100 predicts and calculates a cross point by receiving the operation information of the detected rechargeable unmanned aerial vehicle 200 and may request approval of the battery charging or replacement by transmitting information on the calculated cross point, information on the expected battery charging or replacing time, and the like to the rechargeable unmanned aerial vehicle 200.

The rechargeable unmanned aerial vehicle 200 may turn and progress a direction to the corresponding cross point when calculating or receiving the information on the cross point (③). In this case, the unmanned aerial vehicle 100 may continuously transmit its position information to the rechargeable unmanned aerial vehicle 200.

When the rechargeable unmanned aerial vehicle 200 is close to the chargeable or replaceable range of the battery 110 of the unmanned aerial vehicle 100, the unmanned aerial vehicle 100 may charge or replace the battery 110 (④).

In detail, the processor 140 of the unmanned aerial vehicle 100 performs docking with the rechargeable unmanned aerial vehicle when the rechargeable unmanned aerial vehicle 200 is close to the replaceable range of the battery 110 and performs replacement of the battery 110 by a method of receiving and attaching a new battery from the docked rechargeable unmanned aerial vehicle.

In this case, the unmanned aerial vehicle 100 and the rechargeable unmanned aerial vehicle 200 have a structure capable of being connected to each other to replace the battery 110. Here, the docking means that the unmanned aerial vehicle 100 and the rechargeable unmanned aerial vehicle 200 are connected to each other through the structure while staying in the air through the structure.

When the unmanned aerial vehicle 100 is docked with the rechargeable unmanned aerial vehicle 200, the existing battery 110 is dropped on the ground and a space attached with the new battery is provided. The rechargeable unmanned aerial vehicle 200 may attach a new battery to the space which has been attached with the existing battery 110. Alternatively, in the unmanned aerial vehicle 100, a region attached with the existing battery and a region attached with the new battery 110 may be divided. In this case, the unmanned aerial vehicle 100 may drop the existing battery 110 on the ground or continue the operation while the existing battery 110 is attached, after the new battery is attached.

Meanwhile, the processor 140 of the unmanned aerial vehicle 100 may control the unmanned aerial vehicle 100 to maintain level with the rechargeable unmanned aerial vehicle, when the rechargeable unmanned aerial vehicle is close to the chargeable range of the battery 110. When the level is maintained for a predetermined time, the processor 140 may perform the charging of the battery 110 by a method of wirelessly charging the battery 110 by power supplied from the rechargeable unmanned aerial vehicle 200.

In this case, the processor 140 shifts the unmanned aerial vehicle 100 into a charging-ready state when the level is maintained for the predetermined time. When the unmanned aerial vehicle 100 is shifted into the charging-ready state, the unmanned aerial vehicle 100 transmits a charge start event signal to the rechargeable unmanned aerial vehicle 200, and when the rechargeable unmanned aerial vehicle 200 receives the event signal, charging may start. In this case, for charging, the unmanned aerial vehicle 100 and the rechargeable unmanned aerial vehicle 200 may continuously maintain the level state.

When the charging is completed, the rechargeable unmanned aerial vehicle 200 stops the power transmission and may return to its starting point or a predetermined point (⑤).

Figure 3A:
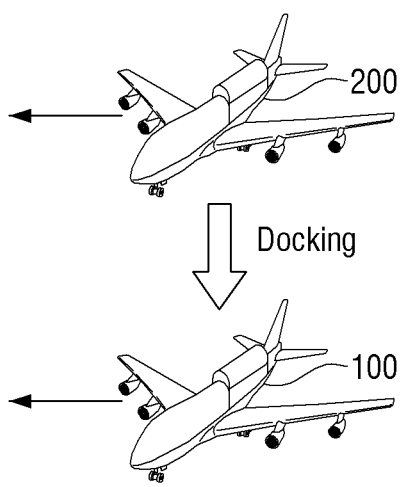
FIGS. 3A and 3B are diagrams for describing a method of replacing a battery while the unmanned aerial vehicle docks with the rechargeable unmanned aerial vehicle according to the exemplary embodiment of the present invention.
Figure 3B:
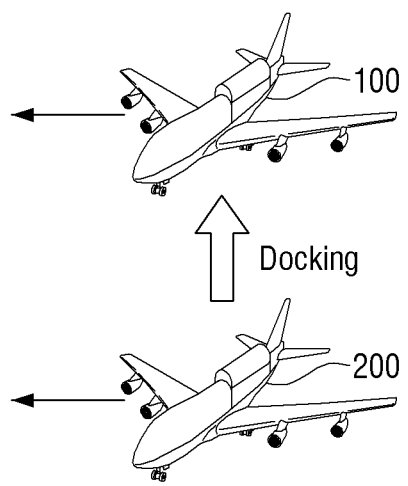

FIGS. 3A and 3B are diagrams for describing a method of replacing a battery while the unmanned aerial vehicle docks with the rechargeable unmanned aerial vehicle according to the exemplary embodiment of the present invention.

FIG. 3A illustrates a method of replacing the battery 110 while the top of the unmanned aerial vehicle 100 docks with the bottom of the rechargeable unmanned aerial vehicle 200. Referring to FIG. 3A, when the rechargeable unmanned aerial vehicle 200 is close to the replaceable range of the battery 110 of the unmanned aerial vehicle 100, the unmanned aerial vehicle 100 detaches and drops the existing installed battery 110 to the ground to ensure a space for a new battery.

When the existing battery 110 is detached, the unmanned aerial vehicle 100 dashes into an emergency flight system to continue the operation by using an emergency battery. In this case, the rechargeable unmanned aerial vehicle 200 may determine information on a current position of the corresponding battery 110 based on a GPS signal through a GPS information collecting apparatus attached to the battery 110.

The rechargeable unmanned aerial vehicle 200 accurately positions its carried new battery at a space in which the battery 110 of the unmanned aerial vehicle 100 is detached and may attach the new battery. To this end, the rechargeable unmanned aerial vehicle 200 may dock with a connection region of the top of the unmanned aerial vehicle 100. In this case, it is preferred that the region attached with the new battery is positioned at the top of the unmanned aerial vehicle 100.

The rechargeable unmanned aerial vehicle 200 may attach the battery to the unmanned aerial vehicle 100 while docking with the unmanned aerial vehicle 100. Power of either the rechargeable unmanned aerial vehicle 200 or the unmanned aerial vehicle 100 stops in the docked state and flight may be performed by only the other power.

When the new battery is attached, the unmanned aerial vehicle 100 releases the emergency flight system and may continue the operation by using the attached new battery. In this case, the unmanned aerial vehicle 100 may perform the charging of the emergency battery which has been consumed in the battery replacing process.

The rechargeable unmanned aerial vehicle 200 determines the position of the battery 110, collects the corresponding battery 110 by moving to the determined position, and then returns to the starting point, based on the GPS signal by the GPS information collecting apparatus attached to the battery 110 dropped on the ground.

FIG. 3B illustrates a method of replacing the battery while the bottom of the unmanned aerial vehicle 100 docks with the top of the rechargeable unmanned aerial vehicle 200.

As illustrated in FIG. 3B, the rechargeable unmanned aerial vehicle 200 docks with the bottom of the unmanned aerial vehicle 100 to replace the battery 110. The rechargeable unmanned aerial vehicle 200 docking with the bottom of the unmanned aerial vehicle 100 accurately positions its carried new battery at a space in which the battery of the unmanned aerial vehicle 100 is detached and may attach the new battery by the same method as described above. In this case, it is preferred that the region attached with the new battery is positioned at the bottom of the unmanned aerial vehicle 100.

Meanwhile, docking between the unmanned aerial vehicle 100 and the rechargeable unmanned aerial vehicle 200 illustrated in FIGS. 3A and 3B may be performed in a ground control apparatus (not illustrated) of the ground system which communicates with at least one of the unmanned aerial vehicle 100 and the rechargeable unmanned aerial vehicle 200.

In detail, when the rechargeable unmanned aerial vehicle 200 is close to the unmanned aerial vehicle 100 within a predetermined distance, the ground control apparatus communicating with the rechargeable unmanned aerial vehicle 200 may dock with the top or the bottom of the unmanned aerial vehicle 100 by controlling the rechargeable unmanned aerial vehicle 200. To this end, the ground control apparatus may receive an image photographed through an imaging apparatus such as a camera attached to the rechargeable unmanned aerial vehicle 200 or an image photographed through an imaging apparatus attached to the unmanned aerial vehicle 100 and transmit a control signal for controlling to dock with the rechargeable unmanned aerial vehicle 200 to the rechargeable unmanned aerial vehicle 200. In this case, when the rechargeable unmanned aerial vehicle 200 docks with the top of the unmanned aerial vehicle 100, it is preferred that the imaging apparatus is provided at the bottom of the rechargeable unmanned aerial vehicle 200 or the top of the unmanned aerial vehicle 100. Further, when the rechargeable unmanned aerial vehicle 200 docks with the bottom of the unmanned aerial vehicle 100, it is preferred that the imaging apparatus is provided at the top of the rechargeable unmanned aerial vehicle 200 or the bottom of the unmanned aerial vehicle 100.

Meanwhile, the ground control apparatus may control the unmanned aerial vehicle 100 to dock with the rechargeable unmanned aerial vehicle 200. In this case, also, the image photographed through the unmanned aerial vehicle 100 or the rechargeable unmanned aerial vehicle 200 may be transmitted to the ground control apparatus, and the ground control apparatus may transmit a control signal for controlling to dock with unmanned aerial vehicle 100 to the unmanned aerial vehicle 100.

Figure 4:
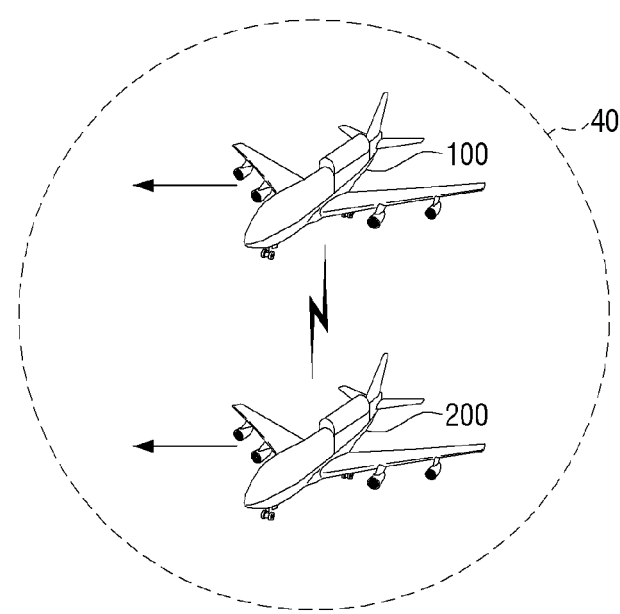
FIG. 4 is a diagram for describing a method of charging a battery while the unmanned aerial vehicle wirelessly receives power from the rechargeable unmanned aerial vehicle according to the exemplary embodiment of the present invention.

FIG. 4 is a diagram for describing a method of charging a battery while the unmanned aerial vehicle wirelessly receives power from the rechargeable unmanned aerial vehicle according to the exemplary embodiment of the present invention.

As illustrated in FIG. 4, the unmanned aerial vehicle 100 may determine whether the rechargeable unmanned aerial vehicle 200 is close to a wirelessly chargeable range 40 of the battery 110 of the unmanned aerial vehicle 100. When it is determined that the rechargeable unmanned aerial vehicle 200 is close to the wirelessly chargeable range 40, the unmanned aerial vehicle 100 may continuously transmit its position information to the rechargeable unmanned aerial vehicle 200 in order to maintain an appropriate distance from the rechargeable unmanned aerial vehicle 200.

The rechargeable unmanned aerial vehicle 200 may maintain the level with the unmanned aerial vehicle 100 by using the received position information and also transmit its position information to the unmanned aerial vehicle 100 to allow the unmanned aerial vehicle 100 to maintain the level with the rechargeable unmanned aerial vehicle 200.

When the unmanned aerial vehicle 100 maintains the level for a predetermined time, the unmanned aerial vehicle 100 is shifted to the charging-ready state and transmits the charging start event signal to the rechargeable unmanned aerial vehicle 200. When the rechargeable unmanned aerial vehicle 200 receives the event signal, the wireless charging may start. In this case, for wireless charging, the unmanned aerial vehicle 100 and the rechargeable unmanned aerial vehicle 200 may continuously maintain the level state.

The wireless charging may be performed by any one method of a method using electromagnetic induction, a method using magnetic resonance, and a method using electromagnetic waves. For the electromagnetic induction, the unmanned aerial vehicle 100 and the rechargeable unmanned aerial vehicle 200 may provide a coil apparatus capable of generating induced current. Accordingly, when a magnetic field is generated in a power transmitting coil provided in the rechargeable unmanned aerial vehicle 200, electricity may be induced in a power receiving coil provided in the unmanned aerial vehicle 100. Meanwhile, for the magnetic resonance, the unmanned aerial vehicle 100 and the rechargeable unmanned aerial vehicle 200 may include receiving coils and transmitting coils capable of resonating at the same frequency, respectively. Accordingly, the transmitting coil provided in the rechargeable unmanned aerial vehicle 200 generates a magnetic field which vibrates at a resonant frequency to allow energy to be intensively transferred to the receiving coil of the unmanned aerial vehicle 100 designed with the same resonant frequency. Further, in order to transmit and receive an electromagnetic wave, the unmanned aerial vehicle 100 and the rechargeable unmanned aerial vehicle 200 may include antennas. When a transmitting antenna provided in the rechargeable unmanned aerial vehicle 200 generates an electromagnetic wave, a rectenna provided in the unmanned aerial vehicle 100 receives the electromagnetic wave to convert the received electromagnetic wave into power.

The unmanned aerial vehicle 100 determines whether the charging is completed by means of the battery residual quantity detector 120, and when the charging is completed, the unmanned aerial vehicle 100 transmits a charging completion message to the rechargeable unmanned aerial vehicle 200. When the rechargeable unmanned aerial vehicle 200 receives the charging completion message, the rechargeable unmanned aerial vehicle 200 stops the power transmission and may return to its starting point or a predetermined point.

FIG. 5 is a flowchart for describing a control method of an unmanned aerial vehicle according to another exemplary embodiment of the present invention.

First, a battery residual quantity of the unmanned aerial vehicle 100 is detected (S510). It is determined whether the detected battery residual quantity is less than a predetermined reference quantity (S520). When the detected battery residual quantity is more than the predetermined reference quantity, no operation is performed (S520: N). However, when it is determined that the detected battery residual quantity is less than the predetermined reference quantity, the rechargeable unmanned aerial vehicle 200 within a predetermined distance from the unmanned aerial vehicle 100 is detected (S530).

When the rechargeable unmanned aerial vehicle 200 is detected, operation information of the unmanned aerial vehicle 100 is transmitted to the detected rechargeable unmanned aerial vehicle 200 (S540). Here, the operation information may include set status information regarding a destination, a current speed, a progress direction, a height, a coordinate, an air flow, and charging or replacement of the battery of the unmanned aerial vehicle 100.

In this case, the unmanned aerial vehicle 100 may receive operation information of the rechargeable unmanned aerial vehicle 200 from the rechargeable unmanned aerial vehicle 200 and calculate a cross point with the rechargeable unmanned aerial vehicle 200 within a shortest time on an operation route of the unmanned aerial vehicle 100 based on the received operation information and its operation information. The unmanned aerial vehicle 100 may transmit information on the calculated cross point and a control signal for controlling the operation route of the rechargeable unmanned aerial vehicle 200 to be changed to the cross point to the rechargeable unmanned aerial vehicle 200.

Meanwhile, the unmanned aerial vehicle 100 determines whether the rechargeable unmanned aerial vehicle 200 is close to a chargeable or replaceable range of the battery (S550). When it is determined that the rechargeable unmanned aerial vehicle 200 is not close to the chargeable or replaceable range of the battery (S550: N), no additional operation is performed, and when it is determined that the rechargeable unmanned aerial vehicle 200 is close to the chargeable or replaceable range of the battery (S550: Y), the battery charging or the battery replacement is performed by the rechargeable unmanned aerial vehicle 200 (S560).

When the charging or replacement of the battery is completed, the rechargeable unmanned aerial vehicle 200 may return to its starting point or a predetermined point.

As such, according to various exemplary embodiments of the present invention, since long endurance of the unmanned aerial vehicle is possible, continuity of the mission of the unmanned aerial vehicle may be ensured and costs for establishing the charging system for charging the unmanned aerial vehicle may be largely reduced.

According to the various exemplary embodiments as described above, the control method of the unmanned aerial vehicle is implemented by a program to be stored in various recoding media. That is, computer programs processed by various processors to execute the foregoing various control methods may be stored and used in the recording media.

As an example, the non-transitory computer readable medium may be provided, which stores the programs of control to detect the residual quantity of the battery, detect the rechargeable unmanned aerial vehicle within a predetermined distance when the detected residual quantity of the battery is less than the predetermined reference quantity, transmit its operation information to the detected rechargeable unmanned aerial vehicle when the rechargeable unmanned aerial vehicle is detected, and charge the battery by the power supplied from the rechargeable unmanned aerial vehicle so as to maintain an operable state of the unmanned aerial vehicle or replace the battery with a new battery provided in the rechargeable unmanned aerial vehicle when being close to the rechargeable unmanned aerial vehicle receiving the operation information.

The non-transitory readable medium means a medium which semi-permanently stores the data and is readable by the apparatus, not a medium which stores the data for a short time, such as a register, a cache, and a memory. In detail, various aforementioned applications or programs may be stored and provided in the non-transitory readable medium such as a CD, a DVD, a hard disk, a blu-ray disk, a USB, a memory card, and a ROM.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. An unmanned aerial vehicle (UAV) comprising:
    a battery;
    a battery residual quantity detector configured to detect a residual quantity of the battery in the UAV;
    a communicator configured to perform communication with a rechargeable unmanned aerial vehicle (RUAV) used in charging or replacement of the battery; and
    a processor configured to control the communicator to transmit operation information of the UAV to the RUAV detected within a predetermined distance when the detected residual quantity of the battery is less than a predetermined reference quantity and control to wirelessly charge the battery by power supplied from the RUAV to maintain an operable state of the UAV or replace the battery to a new battery provided from the RUAV when being close to the RUAV receiving the operation information of the UAV,
    wherein the processor performs the charging or replacement of the battery when the RUAV is close to the chargeable or replaceable range of the battery while maintaining an operation route of the UAV, and
    the RUAV calculates a cross point with the UAV within a shortest time on the operation route of the UAV based on operation information of the RUAV and the operation information received from the UAV and changes an operation route of the RUAV to the cross point to move to the chargeable or replaceable range of the battery,
    wherein, in case of replacing the battery, the battery is replaced by the new battery while the UAV is docked with the RUAV being close to the replaceable range of the battery and receives a new battery from the docked RUAV and the new battery is attached to the UAV, and
    wherein, in case of wirelessly charging the battery, the battery is wirelessly charged by the power supplied from the RUAV while the UAV maintains level with the RUAV being close to the chargeable range of the battery.

2. The unmanned aerial vehicle as claimed in claim 1, wherein the operation information of the UAV includes set status information regarding a destination, a current speed, a height, a coordinate, a progress direction, an air flow, and charging or replacement of the battery.

3. The unmanned aerial vehicle as claimed in claim 1, wherein the processor calculates a quantity of the battery required for the unmanned aerial vehicle to reach a target point and compares the calculated quantity and the residual quantity of the battery to detect the rechargeable unmanned aerial vehicle only when the residual quantity of the battery is smaller than the calculated quantity.

* * * * *